US012683860B2

(12) United States Patent　　　　(10) Patent No.: US 12,683,860 B2

Hooda et al.　　　　　　　　　　　(45) Date of Patent:　　Jul. 14, 2026

(54) TOPOLOGY-DRIVEN INTERCONVERSION OF RING NETWORK CONFIGURATIONS

(71) Applicant: Cisco Technology, Inc., San Jose, CA (US)

(72) Inventors: Sanjay Kumar Hooda, Pleasanton, CA (US); Anand Krishnamurthy, San Jose, CA (US); Madhavan Kasthurirangan, Palo Alto, CA (US); Swati Garg, Cupertino, CA (US); Ruchi Agrawal, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 8 days.

(21) Appl. No.: 18/438,268

(22) Filed: Feb. 9, 2024

(65) Prior Publication Data

US 2025/0260615 A1　　Aug. 14, 2025

(51) Int. Cl.
H04L 41/0816　　(2022.01)
H04L 41/0894　　(2022.01)
(Continued)

(52) U.S. Cl.
CPC ...... H04L 41/0816 (2013.01); H04L 41/0894 (2022.05); H04L 41/12 (2013.01); H04L 45/03 (2022.05)

(58) Field of Classification Search
CPC . H04L 41/0816; H04L 41/0894; H04L 41/12; H04L 45/03; H04L 45/02
See application file for complete search history.

(56) References Cited

U.S. PATENT DOCUMENTS 6,611,537 B1　　8/2003　Edens et al.
10,193,706 B2　　1/2019　Bhattacharya et al.
(Continued)

OTHER PUBLICATIONS

Santana, "VMware NSX Network Virtualization Fundamentals", retrieved on Apr. 16, 2020, at <<https://www.vmware.com/content/dam/digitalmarketing/vmware/en/pdf/products/nsx/vmware-network-virtualization-fundamentals-guide.pdf>> Jan. 1, 2017, pp. 1-210.
(Continued)

*Primary Examiner* — Tonia L Dollinger
*Assistant Examiner* — Joseph M Cousins
(74) *Attorney, Agent, or Firm* — Lee & Hayes, P.C.

(57)　　　ABSTRACT

Methods and devices provide network configuration provisioning wherein, based on topology of a ring network and an ordering of network devices, a network controller requests network devices of the ring network to provision configuration from a first layer 2 network protocol to a second layer 2 network protocol. A network configuration provisioning host receives a ring network configuration intent object from a client device, the ring network configuration intent object specifying one or more network domains comprising network devices of a ring network, a first layer 2 network protocol, and a second layer 2 network protocol. The host causes a network controller to request each network device of the ring network to provision migration. By provisioning configuration of the network devices and network interfaces in accordance with orderings, the network devices can maximally preserve connectivity and minimize disruption of packet traffic over the network during the provisioning.

16 Claims, 11 Drawing Sheets

(51) Int. Cl.
　　 *H04L 41/12*　　　　(2022.01)
　　 *H04L 45/03*　　　　(2022.01)

(56)　　　　　　　References Cited

U.S. PATENT DOCUMENTS

| | | | |
|---|---|---|---|
| 11,265,239 B1 * | 3/2022 | Vinchurkar | H04L 45/02 |
| 11,431,567 B1 | 8/2022 | Jeevaraj et al. | |
| 2003/0016623 A1 | 1/2003 | Grover et al. | |
| 2003/0165119 A1 | 9/2003 | Hsu et al. | |
| 2006/0109802 A1 | 5/2006 | Zelig et al. | |
| 2008/0201333 A1 * | 8/2008 | Rowley | G06Q 10/06 |
| 2014/0169157 A1 | 6/2014 | Pan et al. | |
| 2018/0076974 A1 * | 3/2018 | Colven | H04L 41/0813 |
| 2020/0213227 A1 | 7/2020 | Pianigiani et al. | |
| 2024/0430228 A1 * | 12/2024 | Tambakuwala | H04L 61/5084 |

OTHER PUBLICATIONS

Search Report and Written Opinion for International Application No. PCT/US2025/015118, Dated May 19, 2025, 16 pages.
Tate, et al., "IBM j-type Data Center Networking Introduction", retreived from <<https://proquest.safaribooksonline.com/0738434280>> on May 19, 2025, 286 pages.

* cited by examiner

Figure 4A:
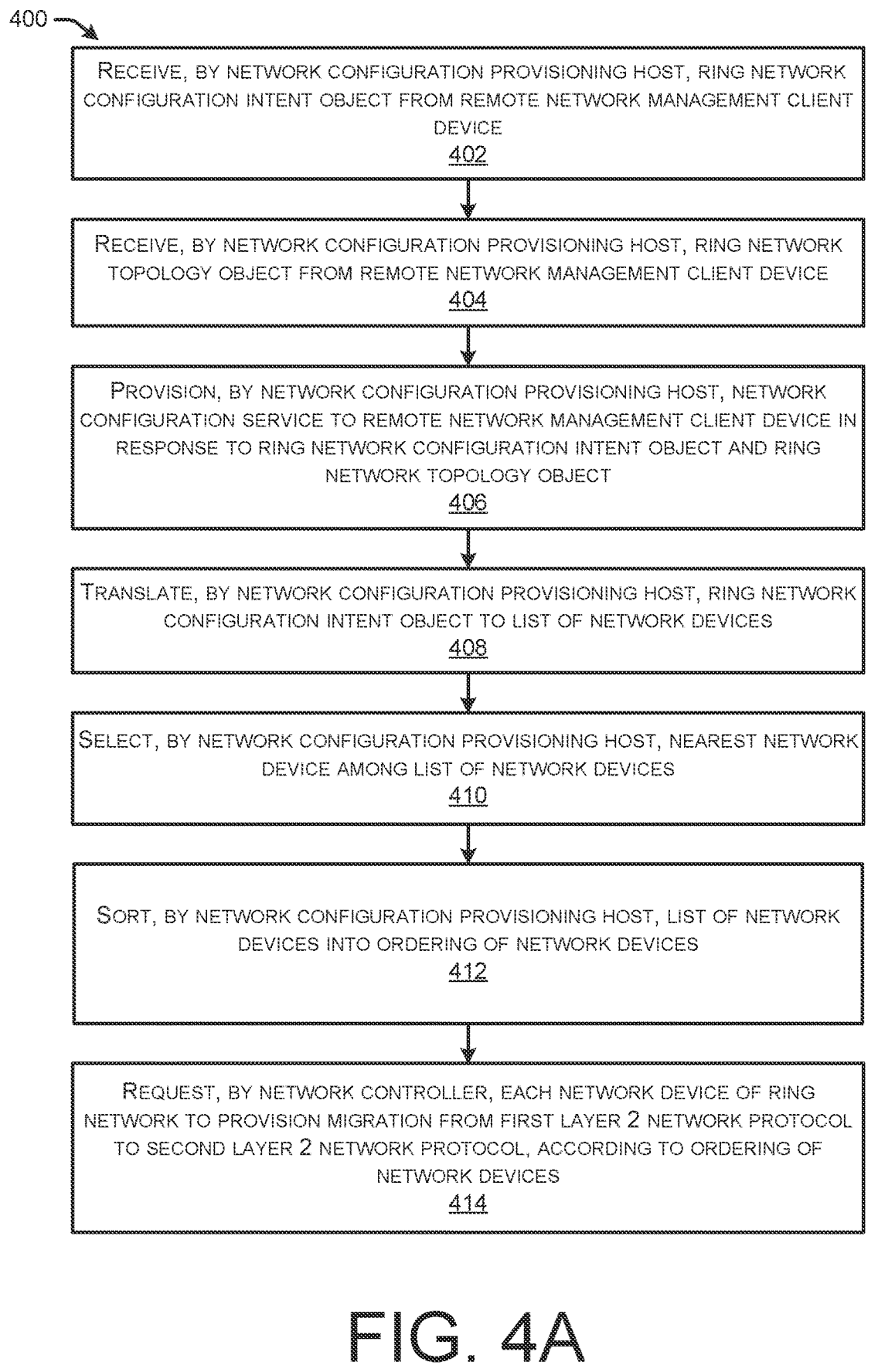

400

RECEIVE, BY NETWORK CONFIGURATION PROVISIONING HOST, RING NETWORK
CONFIGURATION INTENT OBJECT FROM REMOTE NETWORK MANAGEMENT CLIENT
DEVICE
402

RECEIVE, BY NETWORK CONFIGURATION PROVISIONING HOST, RING NETWORK
TOPOLOGY OBJECT FROM REMOTE NETWORK MANAGEMENT CLIENT DEVICE
404

PROVISION, BY NETWORK CONFIGURATION PROVISIONING HOST, NETWORK
CONFIGURATION SERVICE TO REMOTE NETWORK MANAGEMENT CLIENT DEVICE IN
RESPONSE TO RING NETWORK CONFIGURATION INTENT OBJECT AND RING
NETWORK TOPOLOGY OBJECT
406

TRANSLATE, BY NETWORK CONFIGURATION PROVISIONING HOST, RING NETWORK
CONFIGURATION INTENT OBJECT TO LIST OF NETWORK DEVICES
408

SELECT, BY NETWORK CONFIGURATION PROVISIONING HOST, NEAREST NETWORK
DEVICE AMONG LIST OF NETWORK DEVICES
410

SORT, BY NETWORK CONFIGURATION PROVISIONING HOST, LIST OF NETWORK
DEVICES INTO ORDERING OF NETWORK DEVICES
412

REQUEST, BY NETWORK CONTROLLER, EACH NETWORK DEVICE OF RING
NETWORK TO PROVISION MIGRATION FROM FIRST LAYER 2 NETWORK PROTOCOL
TO SECOND LAYER 2 NETWORK PROTOCOL, ACCORDING TO ORDERING OF
NETWORK DEVICES
414

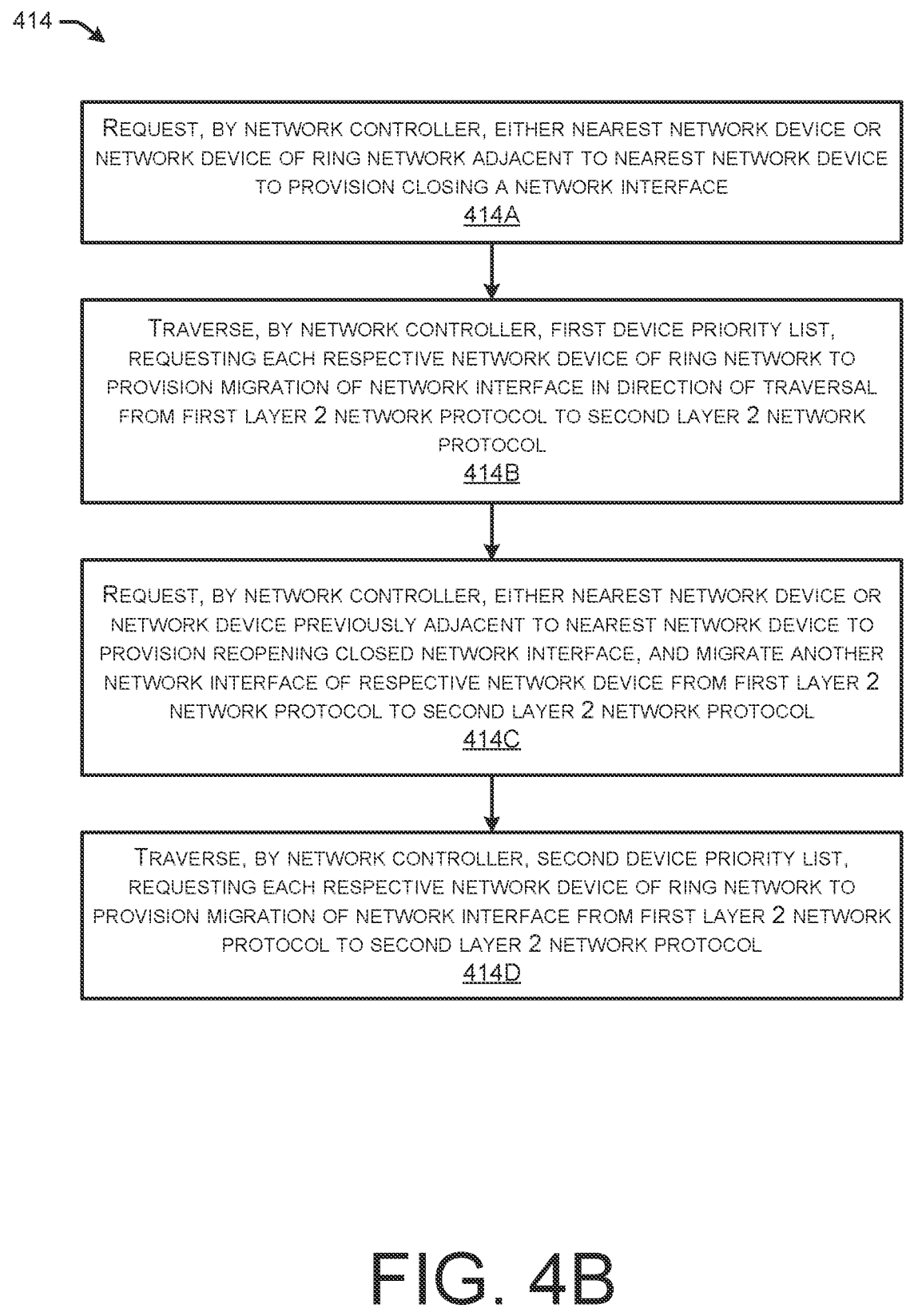

REQUEST, BY NETWORK CONTROLLER, EITHER NEAREST NETWORK DEVICE OR NETWORK DEVICE OF RING NETWORK ADJACENT TO NEAREST NETWORK DEVICE TO PROVISION CLOSING A NETWORK INTERFACE
414A

TRAVERSE, BY NETWORK CONTROLLER, FIRST DEVICE PRIORITY LIST, REQUESTING EACH RESPECTIVE NETWORK DEVICE OF RING NETWORK TO PROVISION MIGRATION OF NETWORK INTERFACE IN DIRECTION OF TRAVERSAL FROM FIRST LAYER 2 NETWORK PROTOCOL TO SECOND LAYER 2 NETWORK PROTOCOL
414B

REQUEST, BY NETWORK CONTROLLER, EITHER NEAREST NETWORK DEVICE OR NETWORK DEVICE PREVIOUSLY ADJACENT TO NEAREST NETWORK DEVICE TO PROVISION REOPENING CLOSED NETWORK INTERFACE, AND MIGRATE ANOTHER NETWORK INTERFACE OF RESPECTIVE NETWORK DEVICE FROM FIRST LAYER 2 NETWORK PROTOCOL TO SECOND LAYER 2 NETWORK PROTOCOL
414C

TRAVERSE, BY NETWORK CONTROLLER, SECOND DEVICE PRIORITY LIST, REQUESTING EACH RESPECTIVE NETWORK DEVICE OF RING NETWORK TO PROVISION MIGRATION OF NETWORK INTERFACE FROM FIRST LAYER 2 NETWORK PROTOCOL TO SECOND LAYER 2 NETWORK PROTOCOL
414D

FIG. 4B

NETWORK DEVICE 600

TOPOLOGY-DRIVEN INTERCONVERSION OF RING NETWORK CONFIGURATIONS

TECHNICAL FIELD

This disclosure relates generally to interconversion of network devices configured according to a ring topology between different network protocols, by configuring network devices according to a topology-driven device ordering.

BACKGROUND

Network devices can be configured according to a ring topology, achieving advantages such as simplicity of configuration, improved performance under load, and ease of diagnostics. Ring networks can be configured according to various layer 2 network protocols, including Spanning Tree Protocol ("STP"), Resilient Ethernet Protocol ("REP"), and Device Level Ring ("DLR"). Each of these protocols provides various advantages, such as prevention of bridging loops.

On deployed networks, network administrators may wish to replace one network protocol with another on network devices configured according to a ring topology. Two configuration processes are available as alternatives. A network administrator can execute procedure calls on a network device according to various command-line interfaces ("CLIs"), by networking to a console server connected by a serial connection to a console port of the network device. A network administrator can alternatively forward requests to a network controller according to REST APIs, where the network controller remotely configures each other network device of a ring network by an Ethernet connection to respective HTTP ports.

Whereas remote configuration of network devices is advantageous, such remote configuration, in practice, interferes with connectivity over the ring network. Consequently, no configuration process is available to replace one network protocol with another on a deployed ring network, while bypassing dedicated console ports, and also avoiding compromise of network connectivity.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The devices depicted in the accompanying figures are not to scale and components within the figures may be depicted not to scale with each other.

FIG. 4A illustrates a network configuration provisioning method implemented by a network configuration provisioning host of FIG. 3 according to example embodiments of the present disclosure. FIG. 4B illustrates further sub-steps of step 414 of FIG. 4A.

DESCRIPTION OF EXAMPLE EMBODIMENTS

Overview

Figure 1:
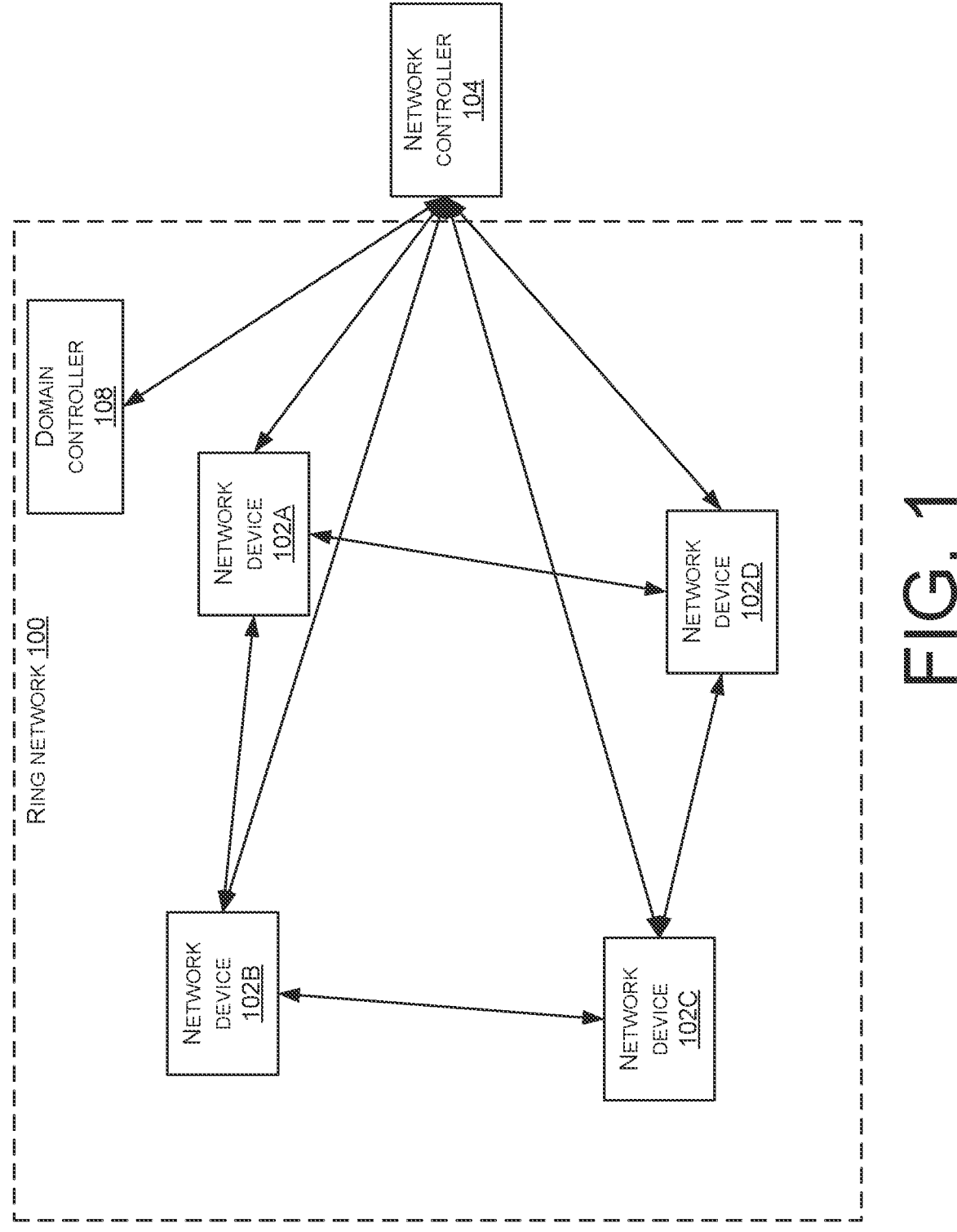
FIG. 1 illustrates a diagram of network devices of a network domain configured according to a ring topology, according to example embodiments of the present disclosure.

This disclosure describes a network configuration provisioning method wherein, based on topology of a ring network and an ordering of network devices, a network controller requests network devices of the ring network to provision configuration from a first layer 2 network protocol to a second layer 2 network protocol. By provisioning configuration of the network devices and network interfaces in accordance with orderings, the network devices can maximally preserve connectivity and minimize disruption of packet traffic over the network during the provisioning.

Example embodiments of the present disclosure provide a network configuration provisioning host which receives a ring network configuration intent object from a client device, the ring network configuration intent object specifying one or more network domains comprising network devices of a ring network, a first layer 2 network protocol, and a second layer 2 network protocol. The host causes a network controller to request each network device of the ring network to provision migration from a first layer 2 network protocol to a second layer 2 network protocol.

The described techniques may be implemented in one or more network devices having one or more processing units configured to execute computer-executable instructions, which may be implemented by, for example, one or more application specific integrated circuits ("ASICs"). The processing units may be configured by one or more non-transitory computer-readable media storing computer-executable instructions that, when executed by the processing units cause the processing units to perform the steps.

Additionally, the techniques described herein may be performed by a device having non-transitory computer-readable media storing computer-executable instructions that, when executed by one or more processors, performs the method described above.

EXAMPLE EMBODIMENTS

According to example embodiments of the present disclosure, a network is configured by a network administrator over an infrastructure including network hosts and network devices in communication according to one or more network protocols. Outside the network, any number of client devices, external devices, and the like can connect to any host of the network in accordance with a network protocol. One or more networks according to example embodiments of the present disclosure can include wired and wireless local area networks ("LANs") and such networks supported by IEEE 802 LAN standards. Network protocols according to example embodiments of the present disclosure can include any protocol suitable for delivering data packets through one or more networks, such as, for example, packet-based and/or datagram-based protocols such as Internet Protocol ("IP"), Transmission Control Protocol ("TCP"), User Datagram Protocol ("UDP"), other types of protocols, and/or combinations thereof.

It should be understood that client devices can include computing devices and systems operated by end users, organizational personnel, and other users, which connect to a campus network as described subsequently. Client devices can also include external devices such as rack servers, load balancers, and the like, which connect to a data center as described subsequently.

The network can be configured to host various computing infrastructures; computing resources; software applications; databases; computing platforms for deploying software applications, databases, and the like; application programming interface ("API") backends; virtual machines; and any other such computing service accessible by users accessing the network from one or more client devices, external devices, and the like. Networks configured to host one or more of the above computing services can be characterized as private cloud services, such as data centers; public cloud services; and the like. Such networks can include physical hosts and/or virtual hosts, and such hosts can be located in a fashion collocated at premises of one or multiple organizations, distributed over disparate geographical locations, or a combination thereof.

A network administrator can control access to the network by configuring a network domain encompassing computing hosts of the network and network devices of the network. A network administrator can further configure a computing host as a domain controller, the domain controller being configured to handle authentication requests from client devices by an authentication protocol, so that users who successfully authenticate over their client devices can establish a network connection to the network domain.

Computing hosts of the network can be servers which provide computing resources for hosted frontends, back-ends, middleware, databases, applications, interfaces, web services, and the like. These computing resources can include, for example, computer-executable applications, databases, platforms, services, virtual machines, and the like.

Network devices are configured to deliver data packets through one or more networks, such as personal area networks ("PANs"), wired and wireless local area networks ("LANs"), wired and wireless wide area networks ("WANs"), the Internet, and so forth. A network device, such as a router, switch, or firewall, can receive, over one or more network interfaces, packets forwarded over one or more networks from other hosts; determine a next hop, route, and/or destination to forward the packets to; and forward the packets, over one or more network interfaces, to a host determined by the next hop, route, and/or destination. The next hop, route, and/or destination in the one or more networks can be determined by any or any combination of static routing tables and various dynamic routing algorithms.

FIG. 1 illustrates a diagram of network devices of a network domain configured according to a ring topology (a "ring network"), according to example embodiments of the present disclosure. FIG. 1 illustrates a ring network 100 including multiple network devices 102A, 102B, 102C, and 102D, where the ring network 100 can be configured in various fashions as described above, as a private cloud service, such as a data center, a public cloud service, and the like; including physical hosts and/or virtual hosts; and with those hosts being located in a fashion collocated at premises of one or multiple organizations, distributed over disparate geographical locations, or a combination thereof.

FIG. 1 further illustrates a network controller 104 in communication with each of the multiple network devices 102A, 102B, 102C, and 102D. The network controller 104 is remote to each of the multiple networks, and can remotely communicate with network devices of any of the networks according to network protocols as described above.

Various different ring networks according to example embodiments of the present disclosure (and network devices therein) can be heterogeneously configured for different computing services and/or different communication protocols, and the network controller 104 can interoperate with all such heterogeneous configurations of networks and network devices.

For example, heterogeneous configurations of ring networks can include data centers and campuses. A data center can be configured to perform high-bandwidth data exchange between external devices, such as rack servers, load balancers, and the like, and can therefore be configured over primarily wired LAN connections. A campus can be configured to serve hosted computing services, applications, databases, and the like to client devices, over a range of possible bandwidths.

Furthermore, heterogeneous configurations of ring networks can include heterogeneous layer 2 network protocols, such as Spanning Tree Protocol ("STP"), Resilient Ethernet Protocol ("REP"), and Device Level Ring ("DLR").

Furthermore, each of the multiple network devices 102A, 102B, 102C, and 102D can be any variety of electronic network devices having specifications generally as described subsequently, such as routers, switches, firewalls, and the like. Underlying hardware configurations of network devices can include commodity hardware, custom hardware, and any other combination thereof. It should be understood that, according to example embodiments of the present disclosure, network devices can be subsequently described using terminology applicable to devices running operating systems based on the Linux kernel, though embodiments of the present disclosure can be implemented on network devices running any suitable network operating system ("NOS").

Furthermore, it should be understood that, according to example embodiments of the present disclosure, a NOS running on network devices configures the network devices to communicate with other devices and systems over a network according to a network management protocol. A network administrator can operate devices or systems, such as a network controller 104, which are external to a network, to remotely configure network devices of the network and remotely command network devices of the network.

For example, a network management protocol can be the Network Configuration Protocol ("NETCONF"), as published by the Internet Engineering Task Force ("IETF") in RFC 4741 and RFC 6241, or can be the Simple Network Management Protocol ("SNMP"), as published by the IETF in RFCs 3411 to 3418. A network management protocol configures network devices of the network to deploy configurations in a standard format. For example, configurations according to a network management protocol can be formatted in Extensible Markup Language ("XML"), JavaScript Object Notation ("JSON"), or any other suitable data object format operative to format configuration files.

Moreover, a NOS running on network devices can configure the network devices to perform remote procedure calls ("RPCs") which can be forwarded according to the network management protocol. By an RPC protocol, a network administrator can operate devices or systems outside a network, to remotely configure a network controller 104 or network devices to run computer-executable instructions without physically accessing the network devices. Google Remote Procedure Call ("gRPC") is an example of an RPC protocol by which an NOS can configure network devices to be remotely configured and to execute remote commands. RPCs can be forwarded to network devices by respective control ports of each network device.

Moreover, service provisioning platforms running on a network controller 104 and other network hosts can configure the network controller 104 and other network hosts to provide representational state transfer ("REST") northbound application programming interface ("API") commands accessible by client devices. By a REST API, a network administrator can operate client devices outside a network to request services and resources of the network controller and other network hosts to provision configuration upon network devices. Requests according to a REST API can be forwarded to network devices by respective HTTP ports of each network device.

FIG. 1 further illustrates a domain controller 108, which can be one of the computing hosts of a network, which can furthermore be configured as part of a network domain encompassing computing hosts of the network. A network administrator can configure a domain controller 108 to handle authentication requests from client devices by an authentication protocol, so that users who successfully authenticate over their client devices can connect to the network domain. Thus, FIG. 1 illustrates an authenticated network connection from the network controller 104 to the domain controller 108, and then from the domain controller 108 to a network device 102A, 102B, 102C, or 102D of a ring network 100.

Furthermore, by some RPC protocols, a network administrator can operate a network controller 104 to transmit an authentication request to any network device, so that, upon obtaining authentication, the network controller 104 can establish a network connection to any network device directly without connecting to a domain controller. FIG. 1 further illustrates several authenticated network connections from the network controller 104 to respective network devices 102A, 102B, 102C, and 102D (without interconnecting through a domain controller).

According to example embodiments of the present disclosure, network administrators can operate a network controller 104 to, in accordance with a network management protocol and/or an RPC protocol, establish one or more network connections to one or more network devices, and forward operation, administration, and maintenance ("OAM") packets over the one or more network connections to the one or more network devices.

Network administrators generally understand that OAM refers to a collection of protocols practiced in administrating and maintaining networks such as those described herein. Network administrators can configure network devices of a network to run OAM services (not illustrated herein) across a transport layer of the network; for the purpose of understanding example embodiments of the present disclosure, it should be appreciated that a running OAM service can configure a network device to parse OAM packets, a data packet format carrying telemetry data describing network performance, allowing network administrators to monitor and trace network traffic, thus discerning abnormal packet forwarding, packet loss, and the like. In accordance with in-situ OAM ("iOAM") proposals, OAM services can configure network devices to encapsulate packets according to various packet header protocols, such as IPV6, SRv6, VXLAN, and the like.

Figure 2:
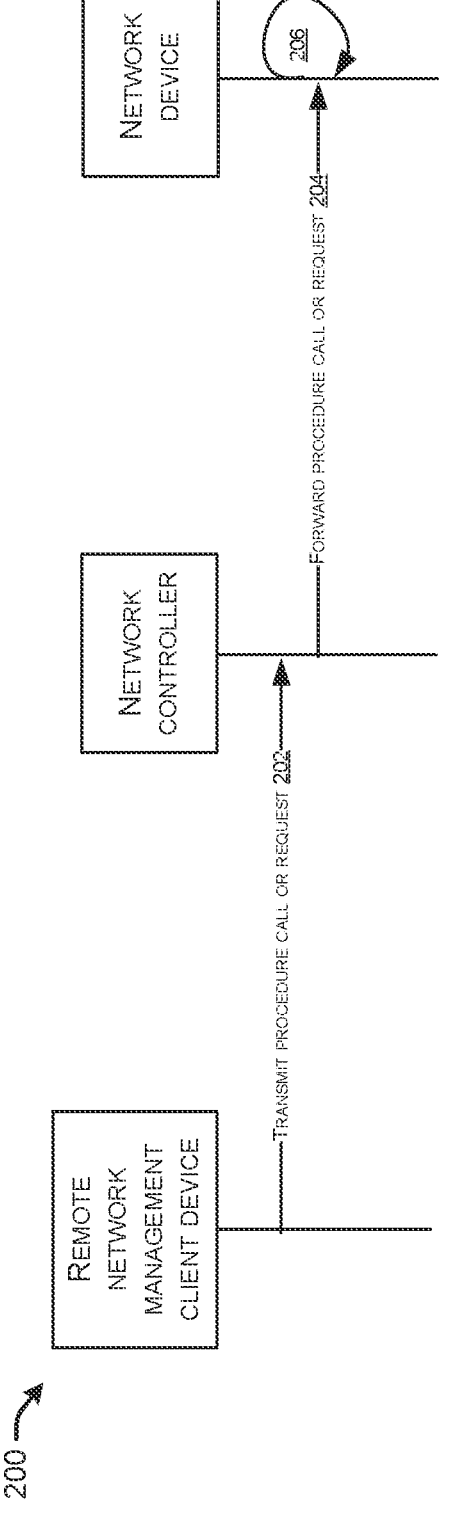
FIG. 2 illustrates an operating protocol for a network controller according to example embodiments of the present disclosure.

By way of example, a network administrator can operate the network controller 104 by a remote network management client device. The remote network management client device can run a remote network management application such as a Cisco DNA Center ("DNAC") dashboard interface, which can run on a remote network management client device locally or can be accessed by a remote network management client device 300 from a remote server. FIG. 2 illustrates an operating protocol 200 for the network controller 104 according to example embodiments of the present disclosure. Steps of the operating protocol 200 can be performed between a remote network management client device and any network device as illustrated above with reference to FIG. 1.

At a step 202, a remote network management client device transmits a procedure call or a request over a network connection to a network controller.

Similar to the above description, a remote network management client device can be configured to establish a network connection according to a network management protocol and/or an RPC protocol. The remote network management client device can be configured to establish a network connection according to a packet-based and/or datagram-based protocol such as Internet Protocol ("IP"), Transmission Control Protocol ("TCP"), User Datagram Protocol ("UDP"), other types of protocols, and/or combinations thereof.

Additionally, the remote network management client device can be configured to establish a network connection which forwards, in one or more OAM packets, procedure calls input at a remote network management client device (according to a command-line interface ("CLI") protocol, APIs of a network management protocol, and other such languages operable with network management protocols) to a network controller, or which forwards, in one or more requests, REST API objects to a network controller.

The network controller can be configured to parse procedure calls from OAM packets and forward procedure calls to network devices for execution according to a network management protocol and/or an RPC protocol. The network controller can be configured to parse REST API objects and forward REST API objects to network devices for service provisioning.

The network device can be configured to execute remotely forwarded procedure calls according to a network management protocol and/or an RPC protocol. The network device can be configured to service remotely forwarded REST API objects by provisioning services according to a service consumption model.

A client device can be configured to encrypt CLI commands and transmit the CLI commands over a secure channel by a cryptographic communication protocol such as Secure Shell ("SSH"). A client device can be configured to forward REST API objects over a data stream by a communication protocol such as Hypertext Transfer Protocol ("HTTP").

At a step 204, the network controller parses the procedure call or the request and forwards the procedure call or the request to a network device.

At a step 206, the network device executes the procedure call or provisions the request.

According to example embodiments of the present disclosure, function calls or procedure calls are executable according to a CLI or according to an API of a network management protocol. For example, these can include a function call or a procedure call according to an RPC CLI, a function call or a procedure call according to SNMP, a function call or a procedure call according to an API of NETCONF, and the like.

According to example embodiments of the present disclosure, requests are provisioned using computing resources according to a service consumption model.

The network controller can forward, and the network device 102A, 102B, 102C, 102D, etc. can be configured to execute, any of various procedure calls executable according to a CLI, or according to an API of a network management protocol, or any of various requests provisioned according to a service consumption model, to configure operating parameters of a network device 102A, 102B, 102C, 102D, etc. as shall be described subsequently (but without limitation thereto).

Procedure calls or requests can include a network interface configuration, which can configure the network device 102A, 102B, 102C, 102D, etc. to bring up or bring down one or more network interfaces of the network device. It should be understood that bringing a network interface up refers to placing a network interface in an administrative up state (which can be referred to as "enabled," "no shutdown," and the like, depending on an NOS running on the network device), and bringing a network interface down refers to placing a network interface in an administrative down state (which can be referred to as "disabled," "shutdown," and the like, depending on an NOS running on the network device).

Procedure calls or requests can include an access control configuration. By way of further elaboration, according to example embodiments of the present disclosure, "access controls" can refer to any implementation of LAN standards which allow access to some client devices outside an access-controlled network domain, and block access to other client devices outside the access-controlled network domain to a physical transmission medium of one or more networks of the access-controlled network domain. Allowance and blocking of access can reflect various authorization policies which describe client devices which are authorized to access the access-controlled network domain and client devices which are not authorized to access the access-controlled network domain.

Among network devices of one or more networks of the access-controlled network domain, some network devices can be configured as network access devices, such as a domain controller as described above. One or more authorization policies can configure network access devices to enforce various types of access control lists ("ACLs"), by identifying client devices as authorized to access the access-controlled network domain or not authorized to access the access-controlled network domain, according to whether client device IP addresses are present on an ACL or not.

Procedure calls or requests can further include a process execution or a process termination, which can configure the network device 102A, 102B, 102C, 102D, etc. to run one or more processes, or terminate one or more processes that a processing unit of the network device 102A, 102B, 102C, 102D, etc. is running.

Procedure calls or requests can further include a routing table configuration, which can configure the network device 102A, 102B, 102C, 102D, etc. to make one or more modifications to a routing table stored at the network device 102A, 102B, 102C, 102D, etc. For example, the network device 102A, 102B, 102C, 102D, etc. can delete an entry of a routing table that indicates a next hop to a network destination, therefore excluding a path from the routing table. Furthermore, the network device 102A, 102B, 102C, 102D, etc. can insert a new entry of a routing table that indicates an arbitrary next hop to a network destination (where the network destination may or may not have another entry in the same routing table), therefore creating a new path in the routing table. Furthermore, the network device 102A, 102B, 102C, 102D, etc. can increase a cost metric recorded in an entry of a routing table, therefore causing a path to be less likely to be selected over other paths.

Procedure calls or requests can further include a control plane configuration, which can configure a processing unit of the network device 102A, 102B, 102C, 102D, etc. to run or terminate one or more control plane processes. Such control plane processes are described in further detail subsequently.

Architecture of one or more ring networks of FIG. 1 can be divided, logically, into at least a control plane and a data plane. The control plane includes collective functions of a network which determine decision-making logic of data routing in the network. For example, the control plane includes hardware functions of a network which record, modify, and propagate routing table information. These hardware functions can be distributed among any number of network devices of a network, including routers, switches, firewalls, and any other devices having decision-making logic.

The data plane includes collective functions of a network which perform data routing as determined by the above-mentioned decision-making logic. For example, the data plane includes hardware functions of a network which forward data packets. These hardware functions can be distributed among any number of network devices of a network, including routers, switches, and other devices having inbound and outbound network interfaces, and hardware running computer-executable instructions encoding packet forwarding logic.

Network devices of the data plane generally forward data packets according to next-hop forwarding. In next-hop forwarding, an ASIC of a network device, configured by computer-executable instructions, can evaluate, based on routing table information (which can be generated by control plane operations), a next-hop forwarding destination of a data packet received on an inbound network interface of a network device; and can forward the data packet over a network segment to the determined destination over an outbound network interface of the network device. It should be understood that individual network devices do not reside wholly within the control plane or data plane, though their routing decision-making operations can define the control plane and their packet forwarding actions can define the data plane.

Network administrators configure different processing units to perform control plane tasks and data plane tasks. For example, according to the CISCO IOS network operating system implemented by CISCO SYSTEMS INC., routing decision-making tasks performed in a control plane are configured to be performed by one or more general-purpose processors of network devices (furthermore including a kernel-level daemon process governing the control plane processes, referred to as IOSd according to CISCO IOS), such as CPUs, and forwarding tasks performed in a data plane are configured to be performed by special-purpose processors, such as ASICs. In this fashion, special-purpose processors are configured to run computer-executable instructions representing dedicated tasks which can be limited in terms of size or length, and general-purpose processors are configured to run a variety of computer-executable instructions representing processes of varying size and higher in computational intensity.

Procedure calls or requests can further include an address resolution configuration, which can configure the network device 102A, 102B, 102C, 102D, etc. to add, modify, or delete one or more entries of an Address Resolution Protocol ("ARP") table. ARP processes implemented at a network device 102A, 102B, 102C, 102D, etc. configures the network device 102A, 102B, 102C, 102D, etc. to map IP addresses to Media Access Control ("MAC") addresses, and subsequently look up such mappings to resolve IP addresses to MAC addresses while resolving packet destinations. Deleting one or more entries of an ARP table can cause inefficient resolution, or failed resolution, of packet destinations.

According to example embodiments of the present disclosure, network devices can include routers, switches, firewalls, and the like. A network device can receive packets forwarded over one or more network links from a host internal to or external to the one or more networks; determine a next hop, route, and/or destination to forward the packets to; and forward the packets to a host internal to or external to the one or more networks, determined by the next hop, route, and/or destination. A network device can be configured to determine a next hop, route, and/or destination by any combination of static routing tables and various dynamic routing algorithms.

A network device can be a physical electronic device having one or more processing units configured to execute computer-executable instructions, which can be implemented by, for example, one or more application specific integrated circuits ("ASICs"). The processing units can be configured by one or more non-transitory computer-readable media storing computer-executable instructions that, when executed by the processing units cause the processing units to perform the steps. For example, the computer-executable instructions can be encoded in integrated circuits of one or more ASICs, stored on memory of one or more ASICs, and the like. Furthermore, processing units can be implemented by one or more central processing units ("CPUs"), each including one or more cores.

A network device 102A, 102B, 102C, 102D, etc. can include computer-readable media, including volatile storage such as memory, and non-volatile memory such as disk storage, that stores an operating system. The operating system can generally support processing functions of the processing unit, such as computing packet routing according to one or more routing algorithms, modifying forwarding tables, distributing packets to network interfaces, and so forth.

A network device can be configured to run computer-executable instructions stored in one or more software images flashed onto computer-readable media of the network device, such as a Basic Input/Output System ("BIOS"), an NOS, and firmware. Software images as described herein can be characterized logically as one or more modules which configure one or more processing units of the network device to perform one or more related operations.

A network device 102A, 102B, 102C, 102D, etc. can include one or more network interfaces configured to provide communications between a respective processing unit and other network devices. The network interfaces can include devices configured to communicate with systems on PANs, wired and wireless LANs, wired and wireless WANs, and so forth. For example, the network interfaces can include devices compatible with Ethernet, Wi-Fi™, and so forth.

According to example embodiments of the present disclosure, a network device, include a router, a switch, a firewall, and the like, can be a computing system having one or more types of hardware modules installed permanently or exchangeably. These hardware modules can include additional processing units, such as ASICs, having computer-executable instructions embedded thereon, as well as computer-readable media having computer-executable instructions stored thereon. They can further include additional network interfaces.

According to example embodiments of the present disclosure, networks are configured in ring topologies, wherein each network device is configured to communicate with exactly two other network devices. Such configuration can be accomplished by individually configuring network interfaces of network devices, including access control configuration, routing table configuration, control plane configuration, and address resolution configuration for each network device and each network interface of each network device.

Network administrators can perform such configuration by forwarding procedure calls to a network controller according to various CLIs, where the network controller causes the network devices to execute the procedure calls over control ports of the network devices. Network administrators can perform such configuration by forwarding requests to a network controller according to a REST API, where the network controller remotely configures the network devices by forwarding requests over an Ethernet connection to respective HTTP ports of the network devices.

Moreover, such configuration can be performed according to various layer 2 network protocols which facilitate network traffic across network devices in a ring network, including Spanning Tree Protocol ("STP"), Resilient Ethernet Protocol ("REP"), and Device Level Ring ("DLR").

By way of example, according to STP, network devices are configured to exchange information by forwarding Bridge Protocol Data Units ("BPDUs"); establish one network device as a root bridge based on information from received BPDUs; and propagate, from a root bridge, BPDUs that cause other network devices to configure network interfaces as designated ports and blocked ports, where designated ports can forward packets to the root bridge.

By way of example, according to REP, network interfaces of network devices are configured to define a number of segments across the ring network, where a segment includes a number of network interfaces across multiple network devices, where two interfaces are configured as edge ports. A network device configured according to REP cannot forward or receive BPDUs according to STP.

By way of example and without limitation thereto, network devices of a ring network can be migrated in configuration from STP to REP. To migrate network devices in this fashion, a network administrator can individually configure network interfaces of network devices configured according to STP, so that the network interfaces establish a segment according to REP.

However, configuration of network devices as illustrated by the above examples is costly for a deployed network carrying traffic; while network devices and network interfaces are individually configured one by one, some network devices and some network interfaces will be incapable of intercommunicating due to their respectively heterogeneous configurations. Consequently, packet traffic across the ring network can be lost, delayed, or otherwise disrupted during such configuration of network devices.

Therefore, example embodiments of the present disclosure provide a remote network management method wherein, based on topology of a ring network and an ordering of network devices, a network controller requests network devices of the ring network to provision configuration from a first layer 2 network protocol to a second layer 2 network protocol. By provisioning configuration of the network devices and network interfaces in accordance with orderings, the network devices can maximally preserve connectivity and minimize disruption of packet traffic over the network during the provisioning.

Figure 3:
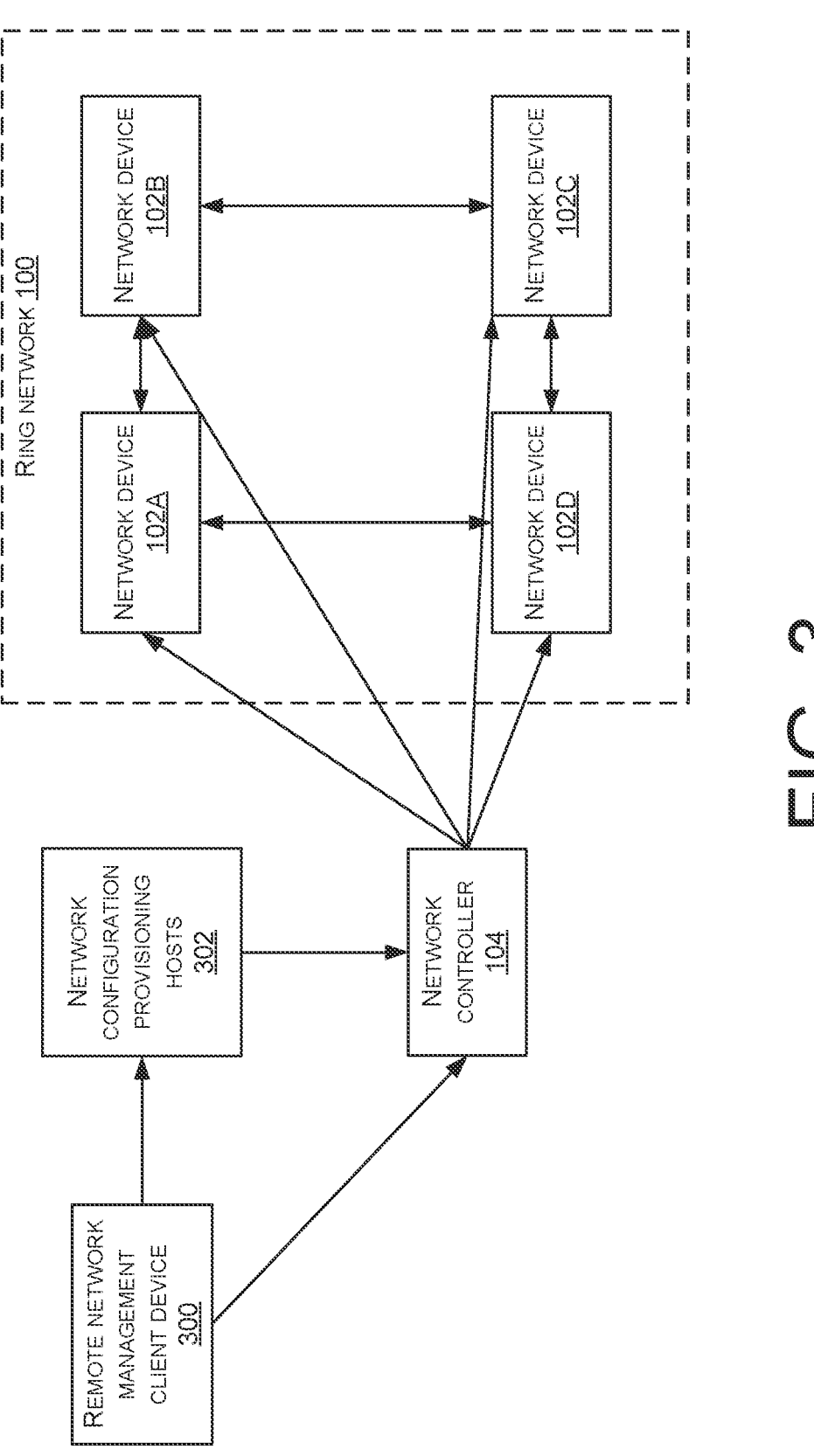
FIG. 3 illustrates a schematic diagram of network configuration provisioning hosts configured in conjunction of a ring network of FIG. 1, according to example embodiments of the present disclosure.
Figures 5A, 5B:
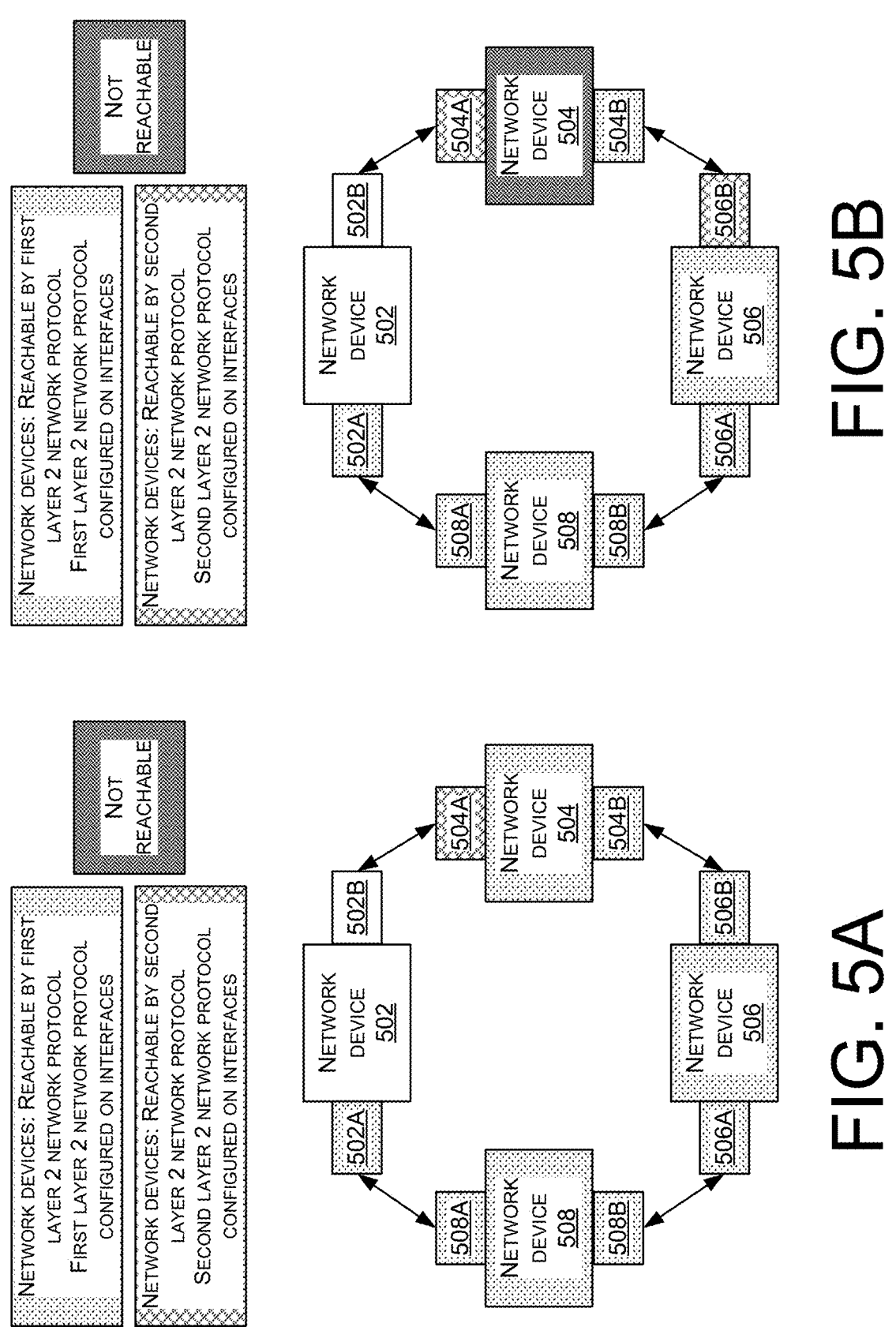
FIGS. 5A through 5H illustrates an example of the sub-steps of step 414 performed across network devices of an example ring network.
Figures 5C, 5D:
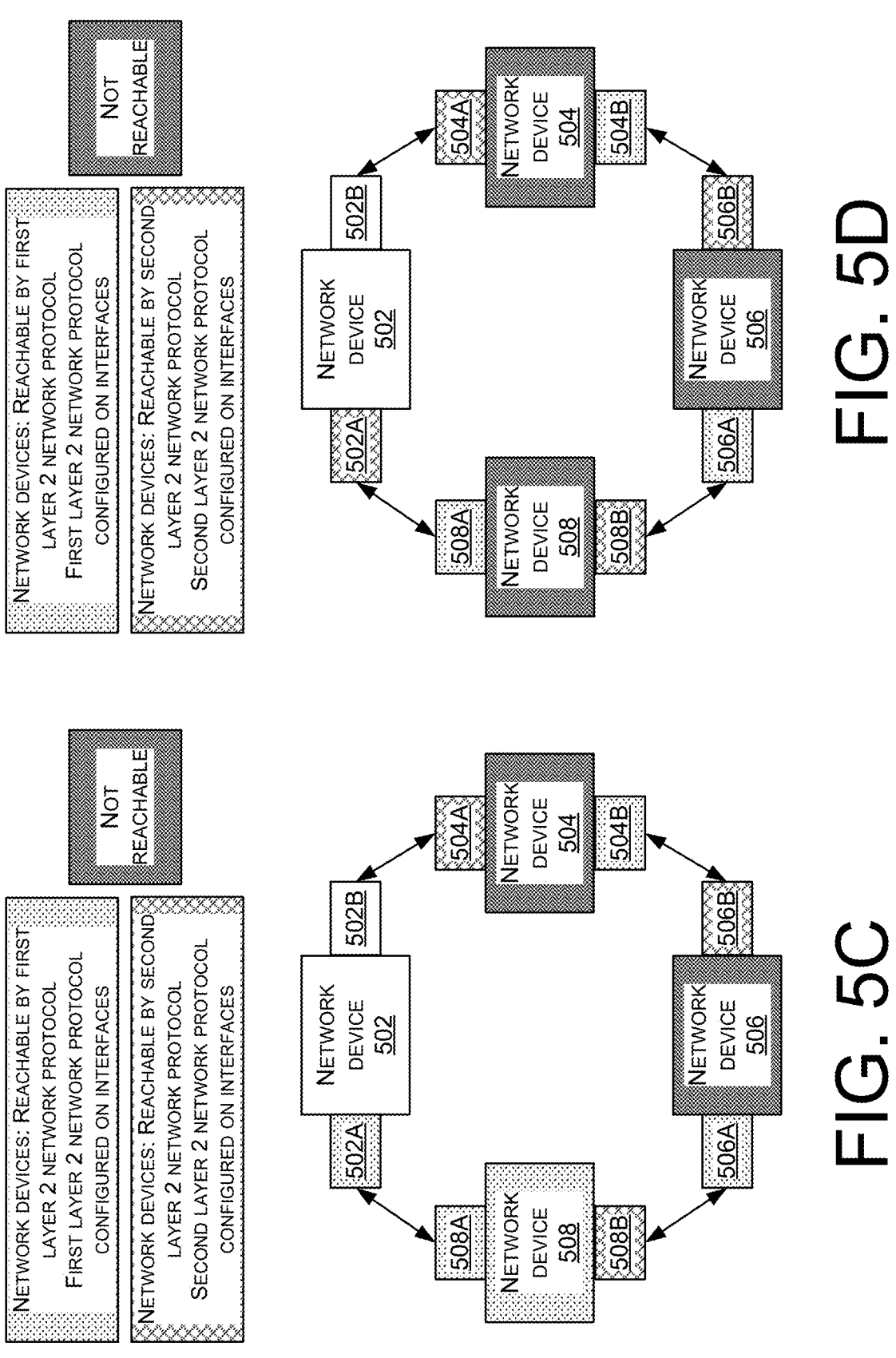
Figures 5E, 5F:
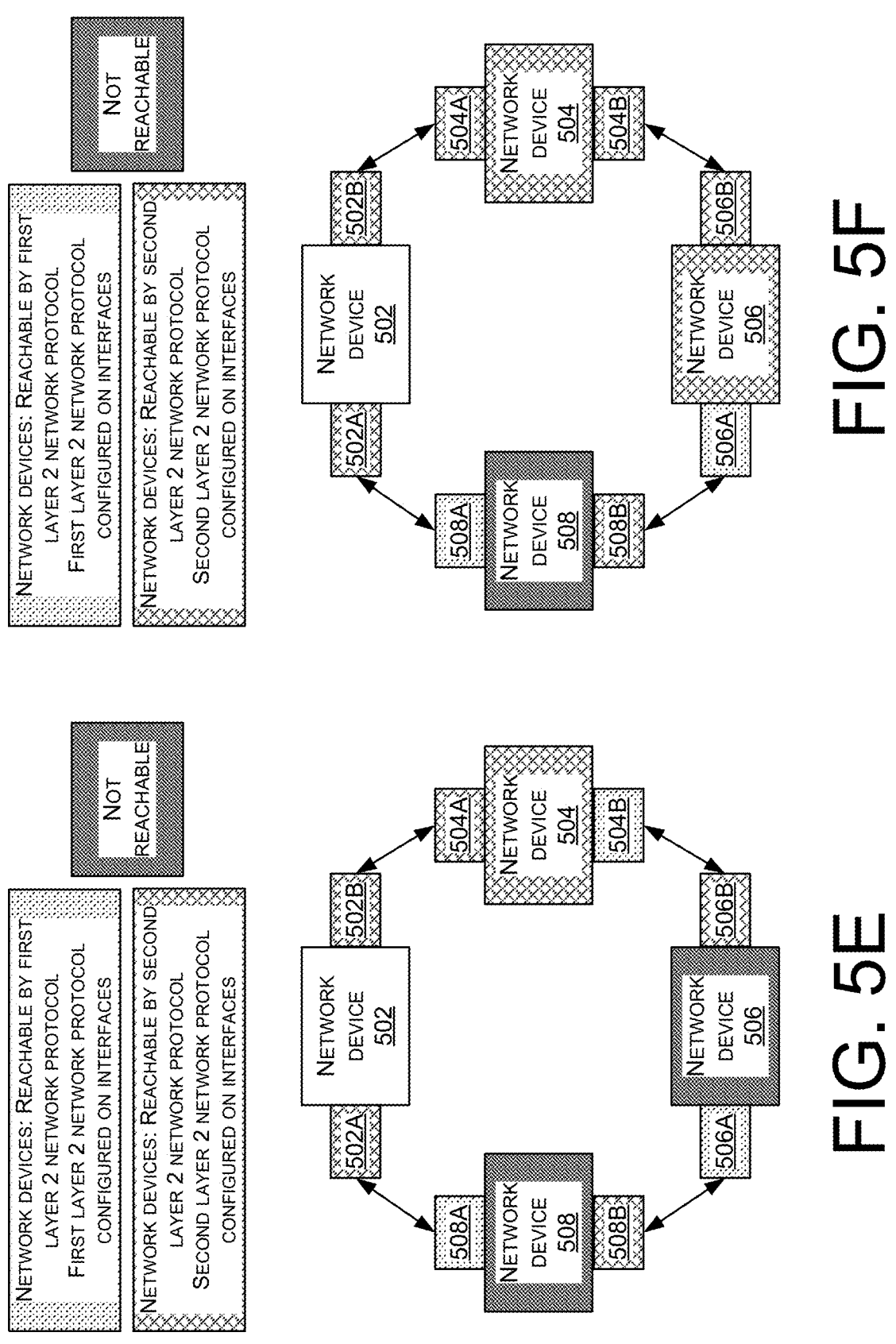
Figures 5G, 5H:
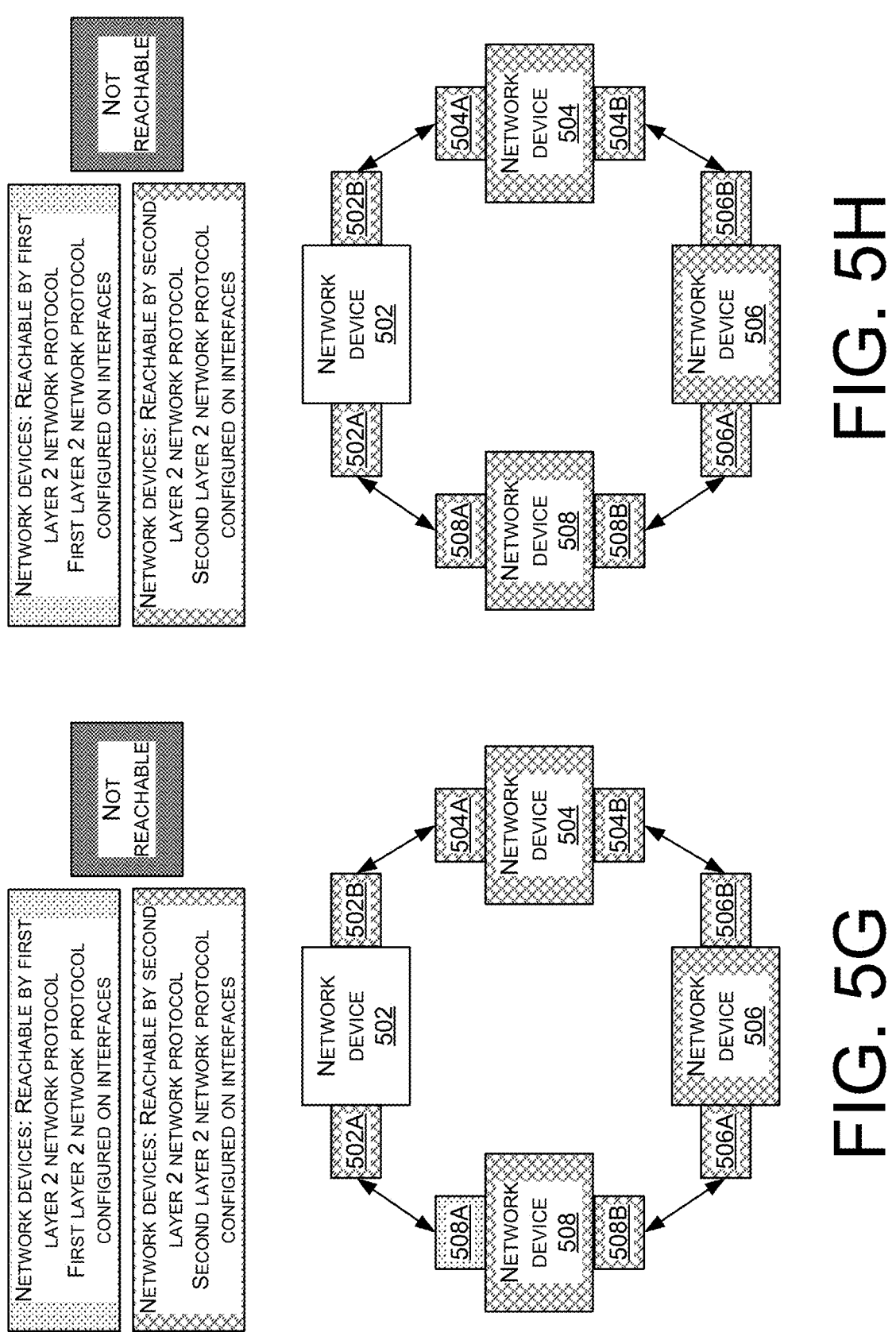

FIG. 3 illustrates a schematic diagram of network configuration provisioning hosts configured in conjunction of a ring network of FIG. 1, according to example embodiments of the present disclosure. Similar to the operating protocol 200 of FIG. 2, a network administrator can operate a network controller 104 to, in accordance with a network management protocol and/or an RPC protocol, establish one or more network connections to one or more network devices 102A, 102B, 102C, 102D, etc. of a ring network 100. By way of example, a network administrator can operate the network controller 104 by a remote network management application such as a DNAC dashboard interface. The remote network management application can run on a remote network management client device 300 locally or can be accessed by a remote network management client device 300 from a remote server.

In addition to the network controller 104 and the remote network management application, example embodiments of the present disclosure further provide one or more network configuration provisioning hosts 302. Network configuration provisioning hosts 302 include one or more network hosts of a ring network 100 or one or more network hosts of a remote network, each hosting a network configuration provisioning platform. A remote network management client device 300 and a network controller 104 can each access the network configuration provisioning platform by one or more network connections to network configuration provisioning hosts 302.

A network configuration provisioning host 302 is configured by a network configuration provisioning platform to receive a ring network configuration intent object and a ring network topology object from a remote network management client device 300; compute an ordering of network devices based on the configuration intent object and the topology object; and request a network controller to forward ordered requests to multiple network devices based on the configuration intent object and the topology object.

According to example embodiments of the present disclosure, the network configuration provisioning hosts 302 are configured by a network configuration provisioning platform to receive requests from the remote network management client device 300 and forward requests to the network controller 104 over respective communication interfaces of the network configuration provisioning hosts 302. Requests can be REST API commands, as described above, and the network configuration provisioning hosts 302 can be configured by a network configuration provisioning platform to listen for the transmission of REST API objects over a data stream of a communication interface.

According to example embodiments of the present disclosure, a "ring network configuration intent object," or "configuration intent object" for brevity, refers to an electronic file in a standard format which describes a task wherein configurations of network devices and network interfaces of a ring network will be migrated from a first layer 2 network protocol to a second layer 2 network protocol. A network configuration provisioning host 302 is configured by a network configuration provisioning platform to parse configuration intent objects in a standard format as REST API objects. For example, configuration intent objects can be formatted in Extensible Markup Language ("XML"), JavaScript Object Notation ("JSON"), or any other suitable data object format.

A ring network configuration intent object according to example embodiments of the present disclosure can specify one or more network domains encompassing network devices configured as a ring network; can specify a first layer 2 network protocol (the current network protocol configured at each network device of the ring network); and can specify a second layer 2 network protocol (a different network protocol from the first).

A ring network configuration intent object according to example embodiments of the present disclosure does not need to specify any procedure calls to be executed or REST API requests to be serviced by individual network devices, including any procedure calls or requests for network interfaces configurations, access control configurations, routing table configurations, control plane configurations, address resolution configurations, and the like.

Furthermore, according to example embodiments of the present disclosure, a "ring network topology object," or "topology object" for brevity, refers to an electronic file in a standard format which describes network connections configured between network devices of a ring network. For example, a topology object can describe a root bridge configured across network interfaces of network devices according to STP, and a spanning tree computed across the network devices based on the root bridge. For example, a topology object can describe one or more segments configured across network interfaces of network devices according to REP, and edge ports configured at the ends of each segment. In general, a topology object describes all network connections which enable network traffic to reach each traffic device according to network interfaces configurations, access control configurations, routing table configurations, control plane configurations, address resolution configurations, and the like.

FIG. 4A illustrates a network configuration provisioning method 400 implemented by a network configuration provisioning host 302 of FIG. 3 according to example embodiments of the present disclosure.

At a step 402, a network configuration provisioning host 302 receives a ring network configuration intent object from a remote network management client device 300.

The network configuration provisioning host 302 can be configured by a network configuration provisioning platform to receive a configuration intent object formatted by a data object format, by listening over a data stream of a network connection to the remote network management client device 300 according to a REST API. The network configuration provisioning host 302 can be configured by a network configuration provisioning platform to parse, from the configuration intent object, one or more network domains encompassing network devices configured as a ring network; a first layer 2 network protocol; and a second layer 2 network protocol from the configuration intent object. By way of example, the network configuration provisioning host 302 can be configured by a network configuration provisioning platform to perform object deserialization upon the configuration intent object, to structure the data stream into objects describing one or more network domains, a first layer 2 network protocol, and a second layer 2 network protocol.

At a step 404, the network configuration provisioning host 302 receives a ring network topology object from the remote network management client device 300.

The network configuration provisioning host 302 can be configured by a network configuration provisioning platform to receive a topology object formatted by a data object format, by listening over a data stream of a network connection to the remote network management client device 300 according to a REST API. The network configuration provisioning host 302 can be configured by a network configuration provisioning platform to parse, from the topology object, network connections configured between network devices of a ring network, such as a root bridge configured according to STP, a spanning tree computed based on the root bridge, segments configured across network interfaces according to REP, and edge ports configured at the ends of each segment. By way of example, the network configuration provisioning host 302 can be configured by a network configuration provisioning platform to perform object deserialization upon the topology object, to structure the data stream into objects describing any of the above-described network connections.

At a step 406, the network configuration provisioning host 302 provisions a network configuration service to the remote network management client device 300 in response to the ring network configuration intent object and the ring network topology object.

In accordance with a service consumption model, REST API requests can configure the network configuration provisioning host 302 to perform various stages of a service consumption and service provisioning process, including validation (determining that REST API objects contain valid data); augmentation (adding more data to a REST API object before forwarding it to another device); persistence (recording a REST API object in persistent storage); versioning (tracking multiple versions of REST APIs, services, objects, and the like); rollbacks of REST API objects to previous versions; and the like.

For example, the network configuration provisioning host 302 can validate that a network domain specified by the configuration intent object forms a valid ring network. The network configuration provisioning host 302 can forward a packet through the ring network to confirm that the packet successfully traverses each network device configured as part of the ring network. One or more network domains specified by the configuration intent object should not be, for example, a ring-of-ring topology, which includes not only a central ring but further edge rings.

At a step 408, the network configuration provisioning host 302 translates the ring network configuration intent object to a list of network devices.

Whereas the ring network configuration intent object is client-facing resource, the network configuration provisioning host 302 can further store resource-facing resources, such as lists of network devices of a ring network, and their corresponding network domains. By provisioning and consuming a resource-facing service, the network configuration provisioning host 302 can be configured by a network configuration provisioning platform to compare network domains identified by a ring network configuration intent object to lists of network devices to translate network domains to (unordered) lists of network devices.

At a step 410, the network configuration provisioning host 302 selects a nearest network device among the list of network devices.

The network configuration provisioning host 302 can be configured by the network configuration provisioning platform to determine a network device having the fewest number of hops to the network controller 104 configured. This network device is selected as the nearest network device.

At a step 412, the network configuration provisioning host 302 sorts the list of network devices into an ordering of network devices.

The network configuration provisioning host 302 can be configured by the network configuration provisioning platform to perform a traversal of the list of network devices, starting from the nearest network device selected as described above, in either a clockwise or a counterclockwise direction based on topology of the ring network. According to example embodiments of the present disclosure, the traversal of the list of network devices includes at least two passes. Each pass of the list of network devices can proceed by device ID proceeding either clockwise from the nearest network device in the ring network topology, or counterclockwise from the nearest network device in the ring network topology.

During each pass, the network configuration provisioning host 302 converts each device ID into a device priority, and records the device ID in association with the device priority in a device priority list. Device priorities can increase or decrease for every network device traversed in the list. Thus, each pass causes the list of network devices to be ordered by ascending priority or descending priority starting from the nearest network device, and proceeding around the ring network in either direction. A first device priority list, generated from the first pass, and a second device priority list, generated from the second pass, can be equivalent in priority or can be opposite in priority.

At a step 414, the network controller 104 requests each network device of the ring network to provision migration from a first layer 2 network protocol to a second layer 2 network protocol, according to the ordering of network devices, while maximally preserving connectivity across the ring network (i.e., reachability of each network device from the network controller 104).

The network configuration provisioning host 302 requests, by forwarding REST API objects, the network controller 104 to provision forwarding each configuration request, as REST API objects, to a network device, and the network controller 104 requests each network device to provision the configuration request. Console ports of each network device are not used to remotely execute procedure calls.

It should be understood that whenever a network device provisions a configuration request as described below, the network device can, as described above, perform various stages of a service consumption and service provisioning process, including validation (determining that REST API objects contain valid data); augmentation (adding more data to a REST API object before forwarding it to another device); persistence (recording a REST API object in persistent storage); versioning (tracking multiple versions of REST APIs, services, objects, and the like); rollbacks of REST API objects to previous versions; and the like.

FIG. 4B illustrates further sub-steps of step 414 as follows:

At a step 414A, the network controller 104 requests either the nearest network device or a network device of the ring network adjacent to the nearest network device to provision bringing down a network interface.

Since each network device of the ring network has two network interfaces configured in connection with other network devices of the ring network, one network device provisioning bringing down one such network interface can preserve connectivity across the ring network from the network controller, but only in one direction. Connectivity cannot be preserved in the other direction after migration begins as described below, so all network devices are made unreachable in the other direction (from the network controller 104) by provisioning bringing down this one network interface.

In this fashion, the ring network is terminated unidirectionally with the nearest network device at its start, and a network device adjacent to the nearest network device at its end; however, traversal for the purpose of migrating configurations, as described subsequently, can proceed in either direction.

The network device requested to provision bringing down a network interface can be the lowest-priority device on the first device priority list, so that the subsequent step 414B can proceed from the highest-priority device on the first device priority list.

At a step 414B, the network controller 104, traversing a first device priority list, requests each respective network device of the ring network to provision migration of a network interface in the direction of traversal from a first layer 2 network protocol to a second layer 2 network protocol.

As mentioned above, each network device has two network interfaces configured in connection with other network devices of the ring network. Among these, each network device only provisions the migration of the network interface leading towards the network interface provisioned to be brought down in step 414A. Each network device does not provision the migration of the other network interface (away from the direction of traversal) during traversal of the first device priority list.

To migrate a network interface from a first layer 2 network protocol to a second layer 2 network protocol, a network device can provision network interfaces configurations, access control configurations, routing table configurations, control plane configurations, address resolution configurations, and the like.

At a step 414C, the network controller 104 requests either the nearest network device or the network device previously adjacent to the nearest network device to provision bringing up a network interface, and migrate another network interface of the respective network device from a first layer 2 network protocol to a second layer 2 network protocol.

Traversal of the first device priority list ends at the previously-adjacent network device. During step 414B, the network devices have been configured to enable network connectivity in the direction opposite from traversal. Therefore, the termination of the ring network during step 414A can now be reversed, and connectivity can be preserved across the ring network in the direction opposite of traversal.

At a step 414D, the network controller 104, traversing a second device priority list, requests each respective network device of the ring network to provision migration of a network interface from a first layer 2 network protocol to a second layer 2 network protocol.

Each network device has one remaining network interface not previously migrated; they are now respectively requested to provision the migration of these remaining network interfaces. Direction of traversal can now be in either direction, so the network interfaces migrated need no longer be away from the direction of travel.

After step 414D completes, if no failures occur, the entire ring network has been migrated from a first layer 2 network protocol to a second layer 2 network protocol. The network administrator can operate the remote network management client device 300 to request the network controller 104 to validate that each network device of the ring network is correctly configured according to the second layer 2 network protocol.

FIGS. 5A through 5H illustrate an example of the substeps of step 414 performed across network devices of an example ring network 500. The ring network 500 includes network devices 502, 504, 506, and 508. They respectively have network interfaces 502A, 502B, 504A, 504B, 506A, 506B, 508A, and 508B configured as part of the ring network 500. 502B and 504A are connected; 504B and 506A are connected; 506B and 508A are connected; and 508B and 502A are connected.

At step 410, the network configuration provisioning host 302 selects network device 502 as the nearest network device, as network device 502 is connected to the network controller 104 by the fewest hops compared to network devices 504, 506, and 508.

At step 412, the network configuration provisioning host 302 sorts the list of network devices into an ordering of network devices 502, 504, 506, and 508, in clockwise order. The ordering includes a first device priority list and a second device priority list, both in clockwise order. The ordering, as well as either or both of the first device priority list and the second device priority list, can each be in counterclockwise order instead.

At step 414A, the network controller 104 requests either network device 502 to provision bringing down interface 502B. Thus, the ring network 500 is terminated unidirectionally with network device 502 at its start and network device 504 at its end. Connectivity over the ring network 500 is preserved counterclockwise.

At step 414B, the network controller 104 requests network device 504 to provision migration of network interface 504A from STP to REP. Then, the network controller 104 requests network device 506 to provision migration of network interface 506A from STP to REP. Then, the network controller 104 requests network device 508 to provision migration of network interface 508A from STP to REP. Then, the network controller 104 requests network device 502 to migrate interface 502A from STP to REP.

At step 414C, the network controller 104 requests network device 502 to provision bringing down interface 502B.

At a step 414D, the network controller 104 requests network device 502 to provision migration of network interface 502B from STP to REP. Then, the network controller 104 requests network device 504 to provision migration of network interface 504B from STP to REP. Then, the network controller 104 requests network device 506 to provision migration of network interface 506B from STP to REP. Then, the network controller 104 requests network device 508 to provision migration of network interface 508B from STP to REP.

After step 414D completes, if no failures occur, the entire ring network has been migrated from STP to REP. The network administrator can operate the remote network management client device 300 to request the network controller 104 to validate that each network device of the ring network is correctly configured according to REP.

During the sub-steps of step 414, it is possible that any network device can fail to provision migration of a network interface. Upon failure of a network device to provision migration of a network interface, the network controller 104, traversing a first device priority list in reverse order from the network device that committed the failure or traversing a second device priority list in reverse order from the network device that committed the failure, requests each respective network device of the ring network to roll back migration of a network interface from a first layer 2 network protocol to a second layer 2 network protocol. Such rollbacks can be performed by reverting to a previous version of REST API objects based on a service consumption and service provisioning process.

By way of example, during step 414D as described above with reference to FIGS. 5A through 5H, assume that network device 504 fails to provision migration of network interface 504B. Network controller 104 detects that network device 504 has become unreachable, as it cannot be reached by REP in a clockwise direction, and cannot be reached by STP in a counterclockwise direction.

Consequently, network controller 104 requests network device 502 to roll back the migration of network interface 502B and provision bringing down network interface 502B. Then, network controller 104 requests network device 502 to roll back the migration of network interface 502A, restoring reachability of network device 508 by STP. Then, network controller 104 requests network device 508 to roll back the migration of network interface 508A, restoring reachability of network device 506 by STP. Then, network controller 104 requests network device 506 to roll back the migration of network interface 506A, restoring reachability of network device 504 by STP. Then, network controller 104 requests network device 504 to roll back the migration of network interface 504A, restoring reachability of network device 502 by STP. Finally, network controller 104 requests network device 502 to provision bringing down network interface 502B, restoring the STP configuration of the entire ring network and recovering from the failure.

Figure 6:
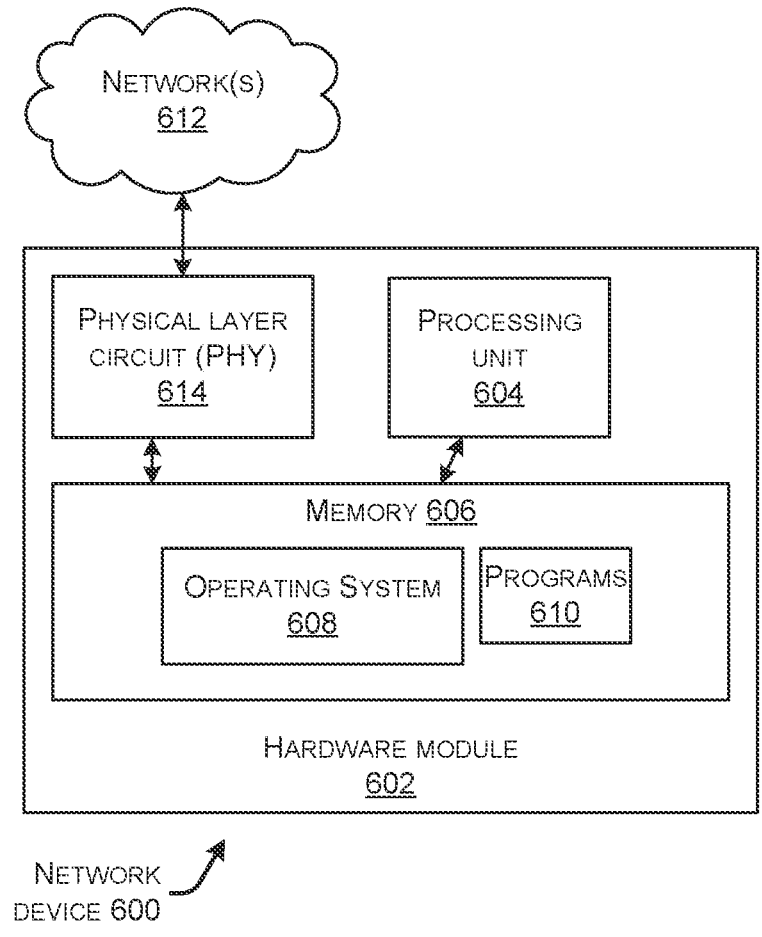
FIG. 6 shows an example architecture for a network device capable of being configured to implement the functionality described herein.

FIG. 6 shows an example architecture for a network device 600 capable of being configured to implement the functionality described above. The architecture shown in FIG. 6 illustrates a computing device assembled from modular components, and can be utilized to execute any of the software components presented herein.

The network device 600 can include one or more hardware modules 602, which can be a physical card or module to which a multitude of components or devices can be connected by way of a system bus or other electrical communication paths. Such a physical card or module can be housed in a standalone network device chassis, or can be installed in a rack-style chassis alongside any number of other physical cards or modules. In one illustrative configuration, one or more processing units 604 can be standard programmable processors or programmable ASICs that perform arithmetic and logical operations necessary for the operation of the hardware module 602.

The processing units 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

Integrated circuits can provide interfaces between the processing units 604 and the remainder of the components and devices on the hardware module 602. The integrated circuits can provide an interface to memory 606 of the hardware module 602, which can be implemented as on-chip memory such as TCAM, for storing basic routines configuring startup of the hardware module 602 as well as storing other software components necessary for the operation of the hardware module 602 in accordance with the configurations described herein. The software components can include an operating system 608, programs 610, and data, which have been described in greater detail herein.

The hardware module 602 can establish network connectivity in a network 612 by forwarding packets over logical connections between remote computing devices and computer systems. The integrated circuits can provide an interface to a physical layer circuit ("PHY") 614 of the hardware module 602, which can provide Ethernet ports which enable the hardware module 602 to function as an Ethernet network adapter.

The hardware module 602 can store data on the memory 606 by transforming the physical state of the physical memory to reflect the information being stored. The specific transformation of physical state can depend on various factors, in different embodiments of this description. Examples of such factors can include, but are not limited to, the technology used to implement the memory 606, whether the memory 606 is characterized as primary or secondary storage, and the like.

For example, the hardware module 602 can store information to the memory 606 by issuing instructions through integrated circuits to alter the electrical characteristics of a particular capacitor, transistor, or other discrete component in a solid-state storage unit. Other transformations of physical media are possible without departing from the scope and spirit of the present description, with the foregoing examples provided only to facilitate this description. The hardware module 602 can further read information from the memory 606 by detecting the physical states or characteristics of one or more particular locations within the memory 606.

The memory 606 described above can constitute computer-readable storage media, which can be any available media that provides for the non-transitory storage of data and that can be accessed by the hardware module 602. In some examples, the operations performed by the network device 600, and/or any components included therein, can be supported by one or more devices similar to the hardware module 602. Stated otherwise, some or all of the operations performed by the network device 600, and/or any components included therein, can be performed by one or more hardware modules 602 operating in a networked, distributed or aggregated arrangement over one or more logical fabric planes over one or more networks.

By way of example, and not limitation, computer-readable storage media can include volatile and non-volatile, removable and non-removable media implemented in any method or technology. Computer-readable storage media includes, but is not limited to, TCAM, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the memory 606 can store an operating system 608 utilized to control the operation of the hardware module 602. According to one embodiment, the operating system comprises the CISCO IOS operating system from CISCO SYSTEMS INC. of San Jose, California. It should be appreciated that other operating systems can also be utilized. The memory 606 can store other system or application programs and data utilized by the hardware module 602.

In one embodiment, the memory 606 or other computer-readable storage media is encoded with computer-executable instructions which transform any processing units 604 from a general-purpose computing system into a special-purpose computer capable of implementing the embodiments described herein. These computer-executable instructions specify how the processing units 604 transition between states, as described above. According to one embodiment, the hardware module 602 has access to computer-readable storage media storing computer-executable instructions which, when executed by the hardware module 602, perform the various processes described above with regard to FIGS. 1-5H. The hardware module 602 can also include computer-readable storage media having instructions stored thereupon for performing any of the other computer-implemented operations described herein.

Figure 7:
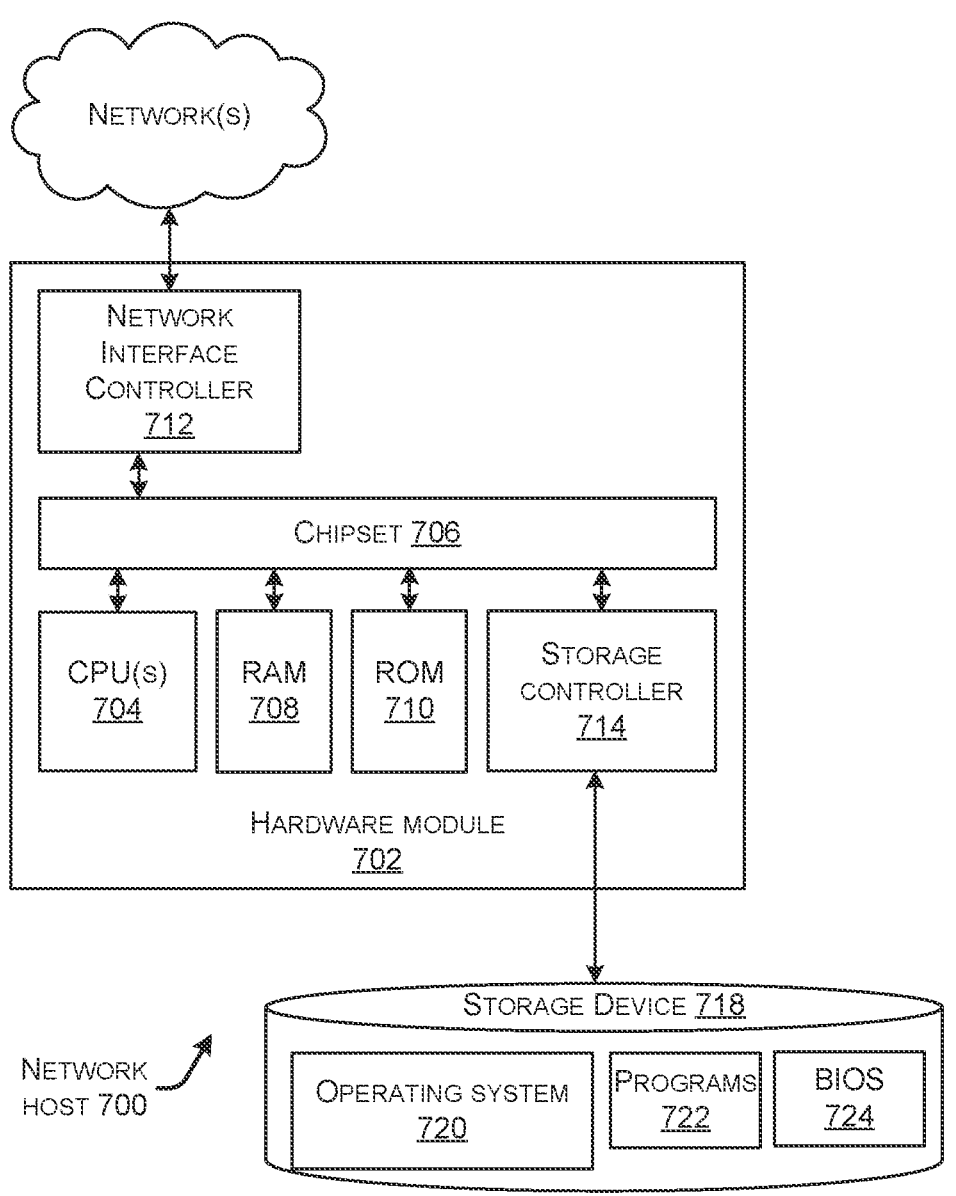
FIG. 7 shows an example computer architecture for a computing host capable of executing program components for implementing the functionality of network controllers and network hosts described herein.

FIG. 7 shows an example computer architecture for a computing host capable of executing program components for implementing the functionality of network controllers and network hosts described above. The computer architecture shown in FIG. 7 illustrates a computing device assembled from modular components, and can be utilized to execute any of the software components presented herein.

One or more hardware modules 702 installed in a computing host 700 may be a physical card or module to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the hardware module 702.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the hardware module 702. The chipset 706 can provide an interface to a RAM 708, used as the main memory in the hardware module 702. The chipset 706 can further provide an interface to a computer-readable storage medium such as a read-only memory ("ROM") 710 or non-volatile RAM ("NVRAM") for storing basic routines that help to startup the hardware module 702 and to transfer information between the various components and devices. The ROM 710 or NVRAM can also store other software components necessary for the operation of the hardware module 702 in accordance with the configurations described herein.

The hardware module 702 can operate in a networked environment using logical connections to remote computing devices and computer systems through a network, such as the broadcast domain as described above. The chipset 706 can include functionality for providing network connectivity through a NIC 712, such as a gigabit Ethernet adapter. The NIC 712 is capable of connecting the hardware module 702 to other computing devices over a network. It should be appreciated that multiple NICs 712 can be present in the hardware module 702, connecting the computing host 700 to other types of networks and remote computer systems.

The hardware module 702 can be connected to a storage device 718 that provides non-volatile storage for the hardware module 702. The storage device 718 can store an operating system 720, programs 722, a BIOS 724, and data, which have been described in greater detail herein. The storage device 718 can be connected to the hardware module 702 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The hardware module 702 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the hardware module 702 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The hardware module 702 can further read information from the storage device 718 by detecting the physical states or characteristics of one or more particular locations within the physical storage units.

In addition to the mass storage device 718 described above, the hardware module 702 can have access to other computer-readable storage media to store and retrieve information, such as program modules, data structures, or other data. It should be appreciated by those skilled in the art that computer-readable storage media is any available media that provides for the non-transitory storage of data and that can be accessed by the hardware module 702. In some examples, the operations performed by a switch of the network overlay, and or any components included therein, may be supported by one or more devices similar to the hardware module 702. Stated otherwise, some or all of the operations performed by a switch of the network overlay, and or any components included therein, may be performed by one or more hardware modules 702 operating in a networked, distributed arrangement over one or more logical fabric planes over one or more networks.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the hardware module 702. According to one embodiment, the operating system comprises the WINDOWS SERVER operating system and derivatives thereof from MICROSOFT CORPORATION of Redmond, Washington. According to another embodiment, the operating system comprises the ENTERPRISE LINUX operating system from RED HAT, INC. of Raleigh, North Carolina. According to another embodiment, the operating system comprises the SUSE LINUX operating system from SUSE, S.A. of Luxembourg. According to another embodiment, the operating system comprises the VSPHERE operating system from VMWARE, INC. of Palo Alto, California. It should be appreciated that other operating systems can also be utilized. The storage device 718 can store other system or application programs and data utilized by the hardware module 702.

In one embodiment, the storage device 718 or other computer-readable storage media is encoded with computer-executable instructions which, when loaded into a computer, transform the computer from a general-purpose computing system into a special-purpose computer capable of implementing the embodiments described herein. These computer-executable instructions transform the hardware module 702 by specifying how the CPUs 704 transition between states, as described above. According to one embodiment, the hardware module 702 has access to computer-readable storage media storing computer-executable instructions which, when executed by the hardware module 702, perform the various processes described above with regard to FIGS. 1-5H. The hardware module 702 can also include computer-readable storage media having instructions stored thereupon for performing any of the other computer-implemented operations described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A network host comprising:
one or more processing units; and
one or more non-transitory computer-readable media storing computer-executable instructions that, when executed by the one or more processing units, cause the one or more processing units to:
receive a ring network configuration intent object and a ring network topology object from a client device, the ring network configuration intent object specifying one or more network domains comprising network devices of a ring network, a first layer 2 network protocol, and a second layer 2 network protocol, and the ring network topology object specifying a root bridge across network interfaces of the ring network or specifying edge ports configured at ends of network segments of the ring network; and
cause a network controller to request each network device of the ring network to provision migration from a first layer 2 network protocol to a second layer 2 network protocol.

2. The network host of claim 1, wherein the computer-executable instructions further cause the one or more processing units to translate the ring network configuration intent object to a list of network devices.

3. The network host of claim 2, wherein the computer-executable instructions further cause the one or more processing units to select a nearest network device among the list of network devices.

4. The network host of claim 3, wherein the computer-executable instructions further cause the one or more processing units to sort the list of network devices into an ordering of network devices.

5. The network host of claim 4, wherein sorting the list of network devices into the ordering of network devices comprises traversing the list of network devices starting from the selected nearest network device, in either a clockwise or counterclockwise direction based on topology of the ring network.

6. The network host of claim 5, wherein traversing the list of network devices comprises performing a plurality of passes, wherein each pass of the plurality of passes comprises, for each network device, recording a device ID in association with a device priority in a device priority list.

7. A network controller comprising:
one or more processing units; and
one or more non-transitory computer-readable media storing computer-executable instructions that, when executed by the one or more processing units, cause the one or more processing units to:
request each network device of a ring network to provision migration from a first layer 2 network protocol to a second layer 2 network protocol, according to an ordering of network devices;
wherein the ordering of network devices is generated by traversing network devices of the ring network starting from a nearest network device over a plurality of passes, in either a clockwise or counterclockwise direction based on topology of the ring network, wherein each pass of the plurality of passes comprises, for each network device, recording a device ID in association with a device priority in a device priority list.

8. The network controller of claim 7, wherein the computer-executable instructions further cause the one or more processing units to request either a nearest network device or a network device adjacent to the nearest network device to provision bringing down a network interface.

9. The network controller of claim 8, wherein the computer-executable instructions further cause the one or more processing units to traverse a first device priority list, and request each respective network device of the ring network to provision migration of a network interface in direction of traversal from a first layer 2 network protocol to a second layer 2 network protocol.

10. The network controller of claim 9, wherein the computer-executable instructions further cause the one or more processing units to request either the nearest network device or the network device previously adjacent to the nearest network device to provision bringing up a network interface, and migrate another network interface of the respective network device from the first layer 2 network protocol to the second layer 2 network protocol.

11. The network controller of claim 10, wherein the computer-executable instructions further cause the one or more processing units to traverse a second device priority list, and request each respective network device of the ring network to provision migration of a network interface from the first layer 2 network protocol to the second layer 2 network protocol.

12. A method comprising:

receiving, by a network host, a ring network configuration intent object and a ring network topology object from a client device, the ring network configuration intent object specifying one or more network domains comprising network devices of a ring network, a first layer 2 network protocol, and a second layer 2 network protocol, and the ring network topology object specifying a root bridge across network interfaces of the ring network or specifying edge ports configured at ends of network segments of the ring network; and causing, by the network host, a network controller to request each network device of the ring network to provision migration from a first layer 2 network protocol to a second layer 2 network protocol.

13. The method of claim 12, further comprising translating the ring network configuration intent object to a list of network devices.

14. The method of claim 13, further comprising selecting a nearest network device among the list of network devices.

15. The method of claim 14, further comprising sorting the list of network devices into an ordering of network devices.

16. The method of claim 15, wherein sorting the list of network devices into the ordering of network devices comprises traversing the list of network devices starting from the selected nearest network device, in either a clockwise or counterclockwise direction based on topology of the ring network.

* * * * *